(12) United States Patent
Ishiguro (10) Patent No.: US 6,229,511 B1
(45) Date of Patent: May 8, 2001

(54) ACTIVE MATRIX SUBSTRATE AND METHOD FOR FABRICATING THE SAME

(75) Inventor: Kenichi Ishiguro, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/012,723

(22) Filed: Jan. 23, 1998

(30) Foreign Application Priority Data

Jan. 24, 1997 (JP) .................................................. 9-011185

(51) Int. Cl.$^7$ ........................................................ G09G 3/36
(52) U.S. Cl. .............................. 345/92; 345/87; 345/90; 349/42; 349/38; 359/54
(58) Field of Search .................................. 345/90, 92, 87; 349/45, 38, 47, 43, 110, 111, 140; 359/54, 59, 67, 87

(56) References Cited

U.S. PATENT DOCUMENTS 5,049,960 * 9/1991 Miwada .................................. 357/24
5,289,029 * 2/1994 Nakashiba ............................. 257/400
5,703,640 * 12/1997 Miwada ................................. 348/272
5,744,820 * 4/1998 Matsushima et al. .................. 257/59

FOREIGN PATENT DOCUMENTS 2-285678   11/1990   (JP) .............................. H01L/29/784
8-262486   10/1996   (JP) ................................ G02F/1/136

* cited by examiner

Primary Examiner—Bipin Shalwala
Assistant Examiner—Jimmy H. Nguyen
(74) Attorney, Agent, or Firm—Nixon & Vanderhye P.C.

(57) ABSTRACT

An active matrix substrate includes: pixel electrodes for display which are disposed in a matrix; active elements for controlling input and output of signals to the pixel electrodes; a driving circuit unit for scanning signals for controlling ON and OFF operation of the active elements in a sequential manner; and a driving circuit unit for data signals for inputting and outputting data to the pixel electrodes via the active elements. A clock signal line in at least one of the driving circuit unit for scanning signals and the driving circuit unit for data signals is formed from a thin metal film for scanning signal lines, and a constant voltage line is formed from a thin metal film for data signal lines.

9 Claims, 6 Drawing Sheets

ACTIVE MATRIX SUBSTRATE AND METHOD FOR FABRICATING THE SAME

BACKGROUND OF THE INVENTION

1. Field of the Invention

The present invention relates to an active matrix substrate used in a liquid crystal display device or the like, and a method for fabricating the same.

2. Description of the Related Art

In recent years, the development of a thin-film transistor (hereinafter, referred to as a "TFT") has been conducted in order to apply the TFT to image display devices such as flat panel displays including a liquid crystal display device. In particular, the development of a driver monolithic type liquid crystal display panel in which polycrystalline silicon TFTs are used so as to form a display unit and a driving circuit unit on the same substrate has been vigorously conducted.

Figure 3:
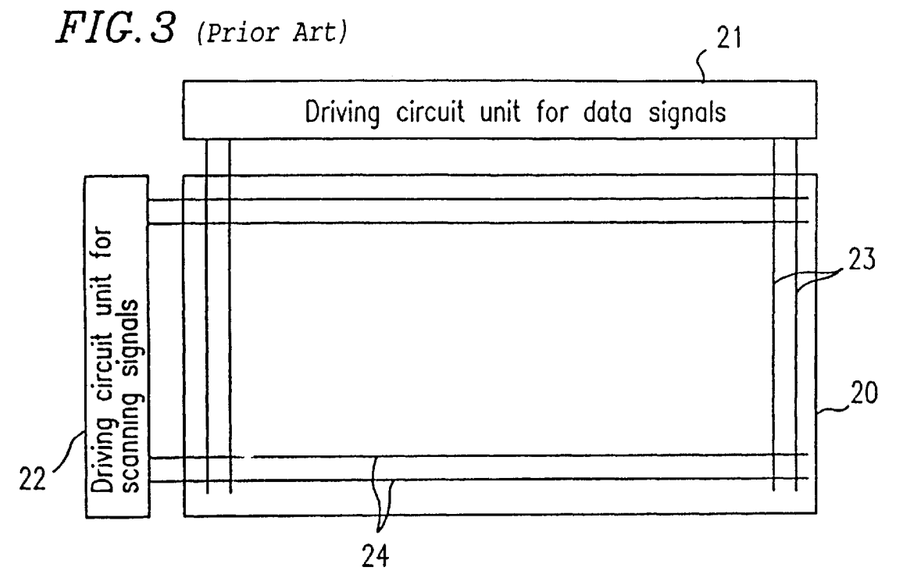
FIG. 3 is a schematic plan view illustrating a general structure of an active matrix substrate.

FIG. 3 is a plan view illustrating such a driver monolithic type active matrix substrate. In FIG. 3, the reference numeral 20 denotes a display unit. The reference numerals 21 and 22 denote a driving circuit unit for data signals and a driving circuit unit for scanning signals, respectively. Each of the driving circuit units 21 and 22 is provided in the periphery of the display unit 20. Data signal lines 23 and scanning signal lines 24 are connected to the driving circuit unit 21 for data signals and the driving circuit unit 22 for scanning signals, respectively.

Figure 4:
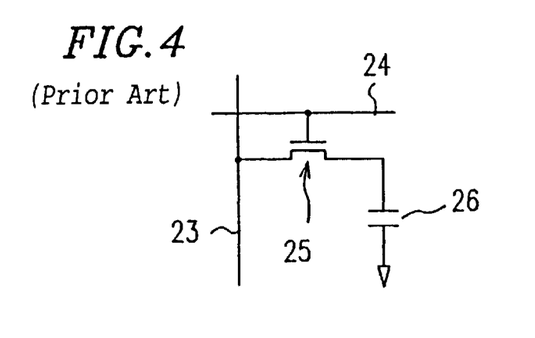
FIG. 4 is a circuit diagram illustrating one pixel portion in a display unit of the active matrix substrate shown in FIG. 3.

As shown in FIG. 4, a pixel TFT 25 as an active element and a pixel electrode 26 are connected to the vicinity of the intersection between the data signal line 23 and the scanning signal line 24 in the display unit 20. A scanning signal from the driving circuit unit 22 for scanning signals drives the pixel TFT 25, and a data signal voltage from the driving circuit unit 21 for data signals is applied to the pixel electrode 26.

Figure 5:
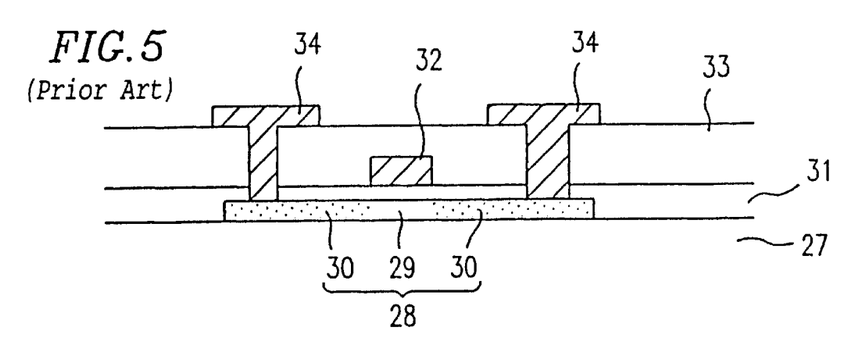
FIG. 5 is a schematic cross-sectional diagram illustrating a structure of a general thin-film transistor.

FIG. 5 is a cross-sectional view illustrating the structure of a TFT in this active matrix substrate. In FIG. 5, the reference numeral 27 denotes a transparent insulating substrate. The reference numeral 28 denotes a semiconductor layer having a channel region 29 and low resistance regions 30. The reference numerals 31 and 32 represent a gate insulating film and a gate electrode, respectively. The reference numerals 33 and 34 represent an interlayer insulating film and source and drain electrodes, respectively. The active matrix substrate includes stagger type TFTs in which the semiconductor layer 28 of the TFT is composed of polycrystalline silicon.

Figure 6:
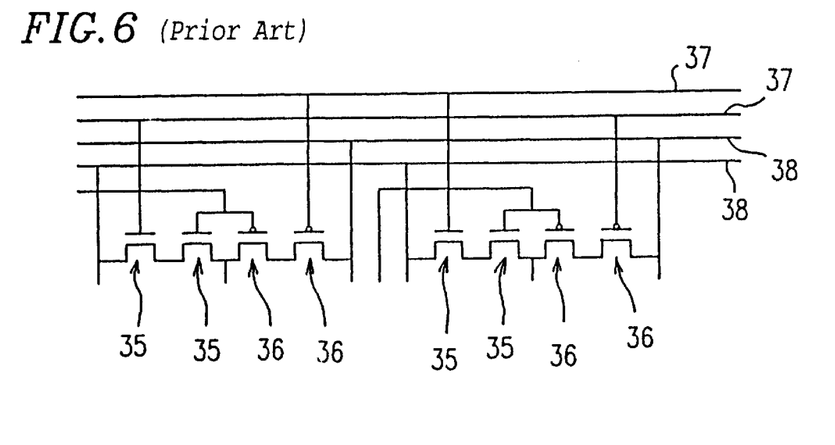
FIG. 6 is a circuit diagram of a conventional clocked inverter.
Figure 7:
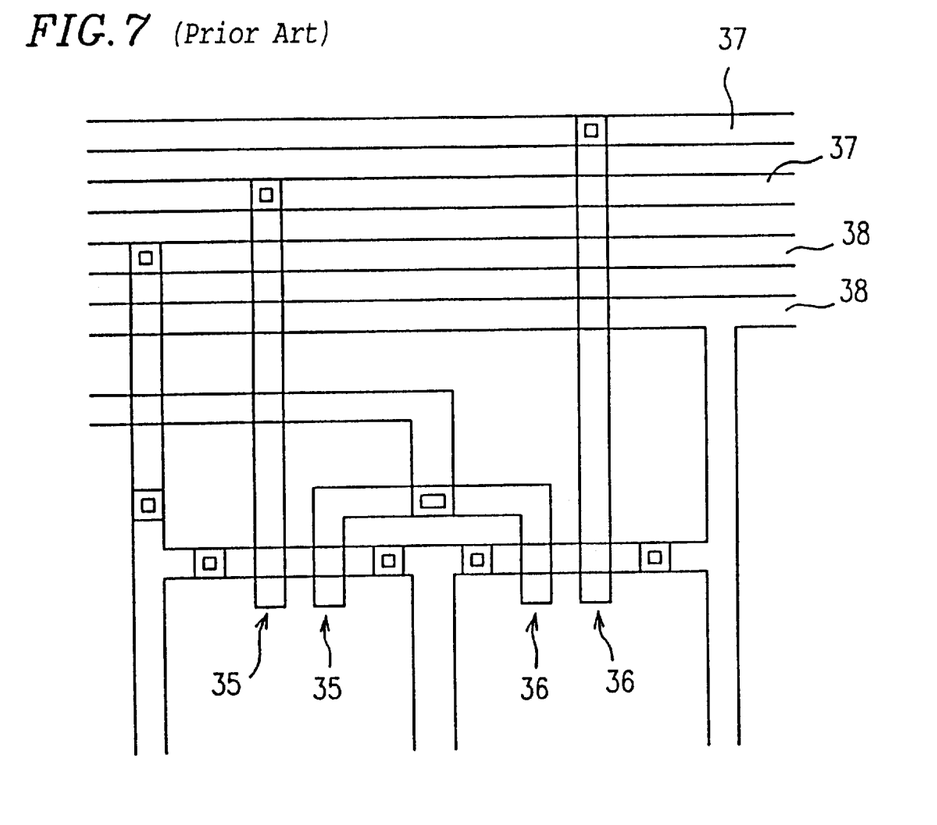
FIG. 7 is a schematic plan view illustrating the clocked inverter shown in FIG. 6.

The above-described driving circuit unit 21 for data signals or the driving circuit unit 22 for scanning signals shown in FIG. 3 generally employs a clocked inverter shown in FIG. 6 as an element in an output unit provided therein or the like. The clocked inverter includes: N-channel type TFTs 35; P-channel type TFTs 36; clock signal lines 37 for driving the TFTs 35 and 36; and constant voltage lines 38 for supplying voltage. Such a complementary type clocked inverter where the N-channel type TFTs 35 and the P-channel type TFTs 36 are combined realizes a higher processing speed of the circuit and lower power consumption as compared to the case where the clocked inverter is composed of the N-channel type TFTs alone. FIG. 7 is a plan view illustrating a pattern of the clocked inverter shown in the left side of FIG. 6.

Figure 8A:
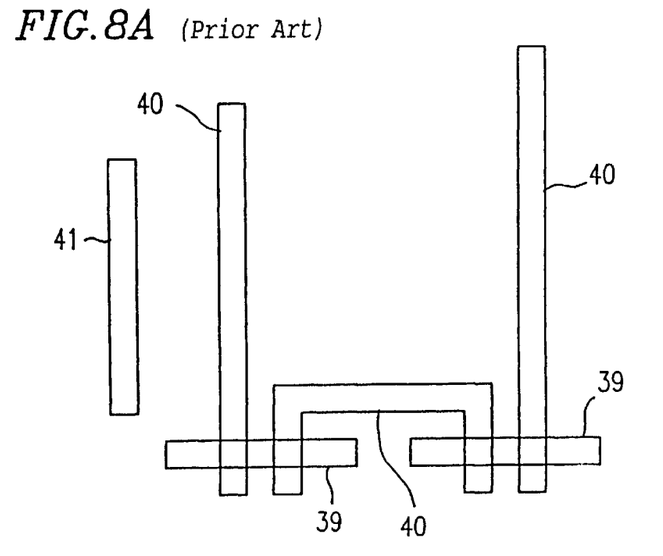
FIGS. 8A and 8B are schematic plan views illustrating fabrication steps of the clocked inverter shown in FIG. 7.
Figure 8B:
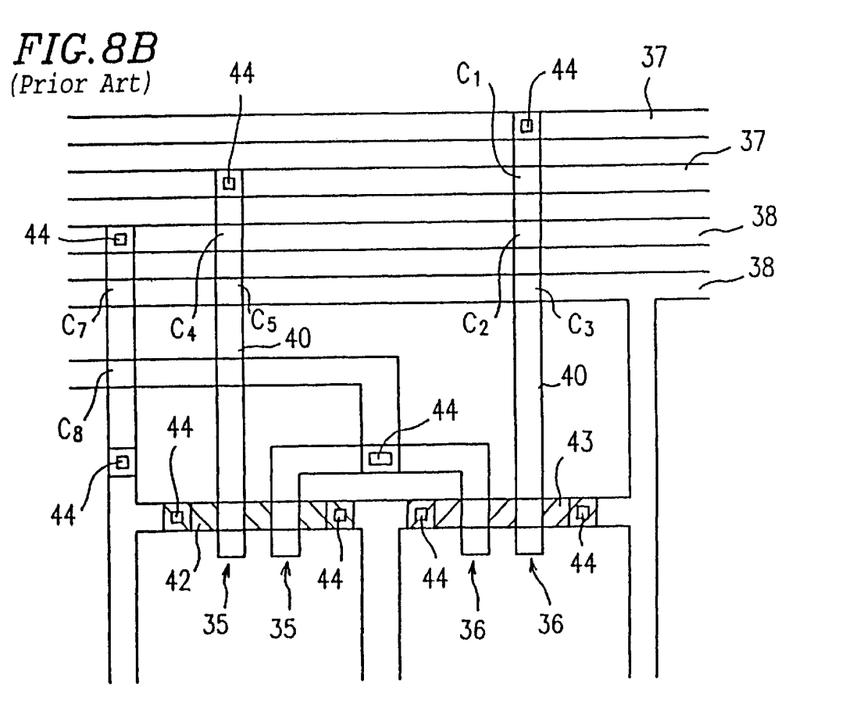

Hereinafter, a method for fabricating the conventional active matrix substrate will be described with reference to FIGS. 8A and 8B illustrating portions of the clocked inverter.

First, as shown in FIG. 8A, polycrystalline silicon thin films 39 are formed as semiconductor layers on a transparent insulating substrate. Then, a $SiO_2$ film is formed so as to form a gate insulating film (not shown). Next, an Al alloy thin film is used to form gate electrodes 40 and a line 41 for a crossing portion in a pattern as shown in FIG. 8A.

Subsequently, as shown in FIG. 8B, an n-type low resistance region 42 and a p-type low resistance region 43 are formed in a pattern as shown by hatching using an ion doping method or the like. Then, a $SiO_2$ film is formed so as to form an interlayer insulating film, and contact holes 44 are formed in the interlayer insulating film. Next, clock signal lines 37 and constant voltage lines 38 are formed by the patterning of the same type of thin metal film, i.e., a thin metal film for data signal lines. In this manner, the clocked inverter portion as shown in FIG. 7 is fabricated.

In such an active matrix substrate, defects in the driving circuit units 21 and 22 having the clocked inverter and the like, immediately leads to defects in the display unit 20. As a result, it is extremely important to improve yield of the driving circuit units 21 and 22. In the conventional driving circuit units shown in FIG. 7, however, due to a large number of the contact holes, these driving circuit units are susceptible to connection failure and the influence of static electricity. Moreover, due to their long line length and a large number of intersections between the lines, breakage of lines is more likely to occur.

As a result, the rate of connection failure at the contact holes and the number of line breakage increase, resulting in an unsatisfactory yield of the active matrix substrate as a product. In order to prevent such line breakage, Japanese Laid-open Publication No. 2-285678 suggests a technique for making a portion of the clock signal line and/or the constant voltage line a double line. However, since such a technique is more likely to be affected by static electricity, the rate of dielectric breakdown at the TFT is high. Thus, with such a technique, an increase in the yield has not been accomplished yet.

Accordingly, there is a need for an active matrix substrate having the reduced number of contact holes and excellent yield.

SUMMARY OF THE INVENTION

According to one aspect of this invention, an active matrix substrate includes: pixel electrodes for display which are disposed in a matrix; active elements for controlling input and output of signals to the pixel electrodes; a driving circuit unit for scanning signals for controlling ON and OFF operation of the active elements in a sequential manner; and a driving circuit unit for data signals for inputting and outputting data to the pixel electrodes via the active elements. A clock signal line in at least one of the driving circuit unit for scanning signals and the driving circuit unit for data signals is formed from a thin metal film for scanning signal lines, and a constant voltage line is formed from a thin metal film for data signal lines.

In one embodiment of the present invention, the at least one of the driving circuit units comprises a clocked inverter; and clock signal lines each supplying a clock signal in a phase opposite to each other to the clocked inverter are disposed with the clocked inverter interposed therebetween.

In another embodiment of the present invention, the active element for controlling input and output of a signal to the pixel electrode is a thin-film transistor and the at least one of the driving circuit units comprises a thin-film transistor. A gate electrode of the thin-film transistor for controlling input and output of a signal to the pixel electrode and a gate electrode of the thin-film transistor in the driving circuit unit are formed from a same thin metal film. Source and drain electrodes of the thin-film transistor for controlling input and output of a signal to the pixel electrode and source and drain electrodes of the thin-film transistor in the driving circuit unit are formed from a same thin metal film.

In still another embodiment of the present invention, the active element for controlling input and output of a signal to the pixel electrode is a thin-film transistor and the at least one of the driving circuit units comprises a thin-film transistor. A gate electrode of the thin-film transistor for controlling input and output of a signal to the pixel electrode and a gate electrode of the thin-film transistor in the driving circuit unit are formed from a same thin metal film. Source and drain electrodes of the thin-film transistor for controlling input and output of a signal to the pixel electrode and source and drain electrodes of the thin-film transistor in the driving circuit unit are formed from a same thin metal film.

According to another aspect of this invention, a method for fabricating an active matrix substrate including: pixel electrodes for display disposed in a matrix; active elements for controlling input and output of signals to the pixel electrodes; a driving circuit unit for scanning signals for controlling ON and OFF operation of the active elements in a sequential manner; and a driving circuit unit for data signals for inputting and outputting data to the pixel electrodes via the active elements, includes the steps of: patterning a thin metal film for scanning signal lines so as to simultaneously form a clock signal line and a scanning signal line in at least one of the driving circuit units; and patterning a thin metal film for data signal lines so as to simultaneously form a constant voltage line and a data signal line in at least one of the driving circuit units.

Thus, the invention described herein makes possible the advantage of (1) providing an active matrix substrate having the reduced number of contact holes and excellent yield and (2) providing a simple method for fabricating such an active matrix substrate.

The present invention is made in consideration of the above-described problems, and aims at improving yield by minimizing the effect of static electricity, which is accomplished by reducing the number of contact holes and changing the positions of lines, so as to reduce the occurrence of disconnection failure at the contact holes and the number of line breakage.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting embodiment with reference to the accompanying drawings.

Figure 1:
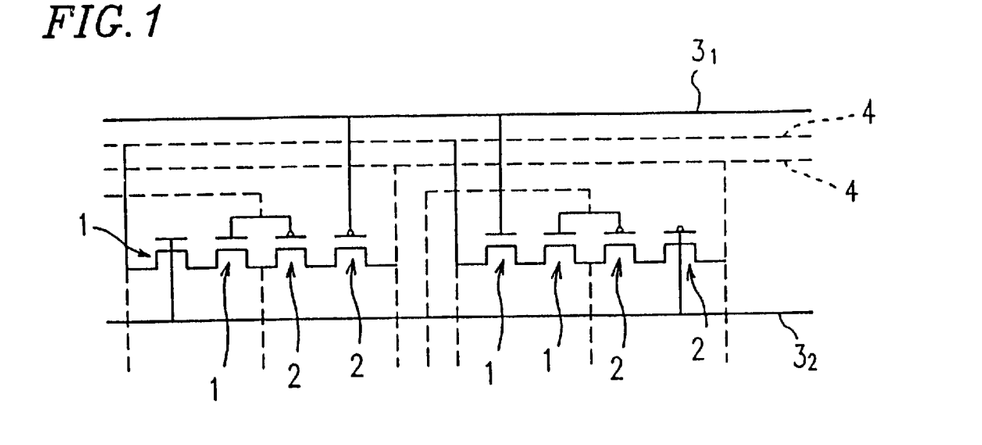
FIG.1 is a circuit diagram illustrating a clocked inverter within a driving circuit of an active matrix substrate according to a preferred embodiment of the present invention.
Figure 2A:
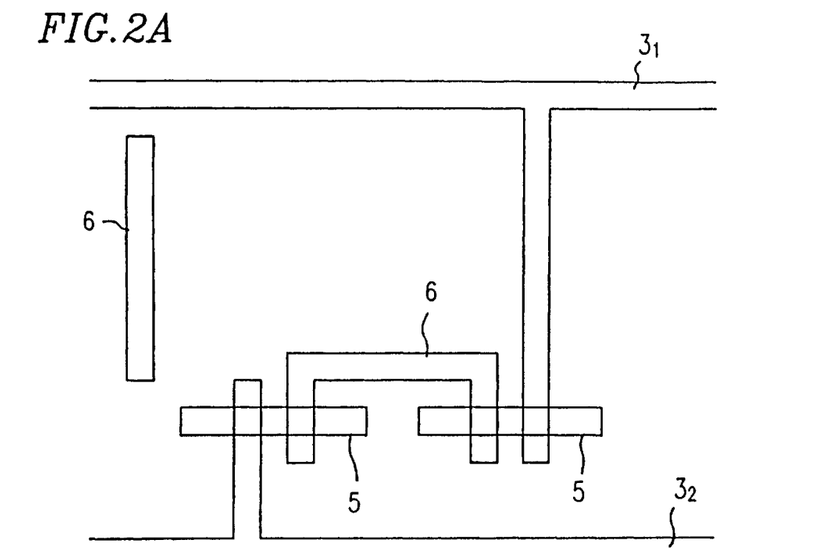
FIGS. 2A and 2B are schematic plan views illustrating fabrication steps of the clocked inverter shown in FIG. 1.
Figure 2B:
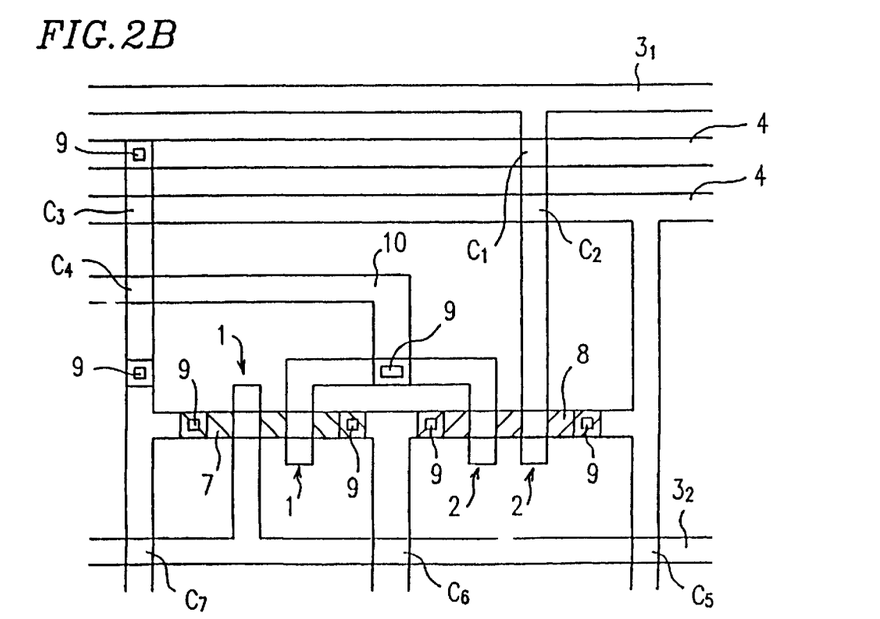

FIG. 1 is a circuit diagram illustrating a clocked inverter within a driving circuit of an active matrix substrate according to a preferred embodiment of the present invention. FIGS. 2A and 2B are schematic plan views illustrating fabrication steps of the clocked inverter shown in FIG. 1. FIGS. 1, 2A, and 2B are comparable to FIGS. 6, 8A and 8B in the above-described conventional active matrix substrate.

The active matrix substrate in the present embodiment is a driver monolithic type active matrix substrate in which the display unit 20 and the driving circuit units 21 and 22 are formed on the same substrate using the polycrystalline silicon TFT as shown in FIGS. 3 and 4. The active matrix substrate includes staggered type TFTs as shown in FIG. 5. Since any appropriate driver monolithic type structure and any appropriate staggered type TFT may be employed, detailed description thereof is herein omitted.

Hereinafter, the clocked inverter will be described with reference to FIG. 1. The clocked inverter is an element in an output unit within the driving circuit unit 21 for data signals or the driving circuit unit 22 for scanning signals in the active matrix substrate, or the like. The clocked inverter includes N-channel type TFTs 1, P-channel type TFTs 2, clock signal line $3_1$ and $3_2$ for driving the TFTs 1 and 2, and constant voltage lines 4 for supplying voltage.

In order to improve yield, the active matrix substrate according to the present embodiment has a structure as described below.

In the clocked inverter provided in the active matrix substrate according to the present embodiment, the clock signal lines $3_1$ and $3_2$ are formed from a thin metal film for scanning signal lines, and the constant voltage lines 4 are formed from a thin metal film for data signal lines. Moreover, the clock signal lines $3_1$ and $3_2$ each supplying a clock signal in a phase opposite to each other are provided with the clocked inverter interposed therebetween.

Hereinafter, a preferred embodiment for a fabrication method of an active matrix substrate having such a structure will be described with reference to FIGS. 2A and 2B illustrating clocked inverter portions.

First, as shown in FIG. 2A, polycrystalline silicon thin films with a thickness of about 10 to about 100 nm, preferably a thickness of about 50 nm, are formed on a transparent insulating substrate using a plasma CVD method or the like so as to form semiconductor layers 5. A $SiO_2$ film with a thickness of about 50 to about 300 nm, preferably a thickness of about 100 nm, is formed so as to form a gate insulating film (not shown). Next, concurrently with the formation of the scanning signal lines 24 in the display unit 20 in FIG. 3, the clock signal lines $3_1$ and $3_2$ and lines 6 for crossing portions are formed by the patterning of a thin metal film for scanning signal lines 24 which is an Al alloy thin film with a thickness of about 100 to about 500 nm, preferably a thickness of about 300 nm.

In other words, according to the present embodiment, the clock signal lines $3_1$ and $3_2$ are simultaneously formed using the thin metal film same as that of gate electrodes of the TFTs 1 and 2.

Subsequently, as shown in FIG. 2B, phosphorus or boron is doped via a resist mask using an ion doping method so as to form an n-type low resistance region 7 and a p-type low resistance region 8. In this manner, the TFTs 1 and 2 are formed. Next, a $SiO_2$ film with a thickness of about 100 nm to about 1 μm, preferably a thickness of about 400 nm, is formed to form an interlayer insulating film. Contact holes 9 are formed in the interlayer insulating film. Moreover, concurrently with the formation of the data signal lines 23 in the display unit 20 shown in FIG. 3, constant voltage lines 4 and a line 10 for a crossing portion are formed by the patterning of a thin metal film for data signal lines 23 which is an Al alloy thin film having a thickness of about 300 to about 800 nm, preferably a thickness of about 500 nm.

Although only the clocked inverter portion is shown in FIGS. 2A and 2B, the pixel TFT 25 (FIG. 4) as an active element in the display unit 20 in FIG. 3 is also formed simultaneously with the TFTs 1 and 2 in the clocked inverter in accordance with the above-described steps.

As described above, since the clock signal lines $3_1$ and $3_2$ are formed from the thin metal films for scanning signal lines which form the gate electrodes of the TFTs 1 and 2, the need for forming the contact holes 44 and connecting the clock signal lines 37 to the gate electrodes 40 of the TFTs 35 and 36 via the contact holes 44, as required in the conventional active matrix substrate shown in FIGS. 8A and 8B, is eliminated. Thus, the number of the contact holes at the driving circuit unit can be reduced and thus, the yield is improved.

Moreover, according to the present embodiment of this invention, since the clock signal lines $3_1$ and $3_2$ each supplying a clock signal in a phase opposite to each other are disposed with the clocked inverter interposed therebetween, the number of crossing portions between lines where line breakage is likely to occur can be reduced as compared to the conventional active matrix substrate shown in FIGS. 8A and 8B. More specifically, the number of crossing portions between lines are 8, i.e., $c_1$ to $c_8$ in the conventional active matrix substrate shown in FIG. 8B, whereas the number of crossing portions between lines are 7, i.e., $c_1$ to $c_7$ in the present invention shown in FIG. 2B.

Furthermore, according to the present embodiment of this invention, the gate electrode of the pixel TFT 25 in the display unit 20 and the scanning signal lines 24 shown in FIGS. 3 and 4 are formed concurrently with the formation of the clock signal lines $3_1$ and $3_2$ using the thin metal film for scanning signal lines. Also, according to the present embodiment of this invention, the source and drain electrodes and the data signal lines 23 are formed concurrently with the formation of the constant voltage lines 4 using the thin metal film for data signal lines. Thus, the number of fabrication steps can be reduced as compared, for example, to the case where the gate electrode of the pixel TFT 25 in the display unit 20 and the gate electrode of the TFT in the driving circuit unit are formed in different steps.

Although the present embodiment of this invention employs polycrystalline silicon as a semiconductor layer, a substrate or a thin film formed of any one of single crystalline silicon, sapphire, or diamond may be used. Preferably, mobility μ of these materials is $μ≧5$ cm²/V·s. This is because if the mobility μ is less than 5 cm²/V·s, clock signals are often changed before the TFTs are in an ON or OFF state, so that the circuit does not respond to the changed clock signals.

The materials and thicknesses of the thin metal film and insulating film are not limited to those in the above-described embodiment. In consideration with yield and production efficiency in the fabrication steps, any appropriate materials and film thicknesses may be employed.

Although the present invention is applied to the clocked inverter portion in the driving circuit units 21 and 22 in the above-described embodiment, the present invention can be applied not only to the clocked inverter but also to any portion in the driving circuit units. That is, in at least one of the driving circuit units 21 and 22, the clock signal lines may be formed from the thin metal film for scanning signal lines, and the constant voltage lines may be formed from the thin metal film for data signal lines.

As described above, according to the present invention, the clock signal lines in at least one of the driving circuit unit for scanning signals and the driving circuit unit for data signals are formed from a thin metal film for scanning signal lines (i.e., a thin metal film forming the gate electrode of the thin-film transistor as an active element). As a result, there is no need for providing contact holes for connecting the gate electrodes of the thin-film transistors and the clock signal lines as required in the prior art. Accordingly, the number of the contact holes which are susceptible to connection failure and the influence of static electricity can be reduced, and thus, yield can be improved.

In a preferred embodiment of this invention, the clock signal lines each supplying a clock signal in a phase opposite to each other are disposed with the clocked inverter interposed therebetween. Thus, the number of crossing portions between lines where line breakage is likely to occur can be reduced as compared to the conventional active matrix substrate in which both of the clock signal lines are disposed in one side of the clocked inverter. As a result, yield is improved.

In another preferred embodiment of this invention, the gate electrode of the thin-film transistor for controlling input and output of signals to the pixel electrode and the gate electrode of the thin-film transistor in the driving circuit unit are formed concurrently with the formation of the clock signal line using the thin metal film for scanning signal lines, and also the source and drain electrodes of both of the thin-film transistors are formed concurrently with the formation of the constant voltage line using the thin metal film for data signal lines. As a result, the number of steps for fabricating the active matrix substrate can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate, comprising:

pixel electrodes for display which are disposed in a matrix;

active elements for controlling input and output of signals to the pixel electrodes;

a driving circuit unit for sending scanning signals on scanning signal lines for controlling ON and OFF operation of the active elements in a sequential manner; and a driving circuit unit for sending data signals on data signal lines for providing data to the pixel electrodes via the active elements, wherein a clock signal line in at least one of the driving circuit unit for scanning signals and the driving circuit unit for data signals is formed from a first same thin metal film as used for forming said scanning signal lines, and a constant voltage line is formed from a second same thin metal film as used for forming said data signal lines.

2. An active matrix substrate according to claim 1, wherein the at least one of the driving circuit units comprises a clocked inverter; and clock signal lines each supplying a clock signal in a phase opposite to each other to the clocked inverter are disposed with the clocked inverter interposed therebetween.

3. An active matrix substrate according to claim 1, wherein the active element for controlling input and output of a signal to the pixel electrode is a thin-film transistor and the at least one of the driving circuit units comprises a thin-film transistor;

a gate electrode of the thin-film transistor for controlling input and output of a signal to the pixel electrode and a gate electrode of the thin-film transistor in the driving circuit unit are formed from a third same thin metal film; and source and drain electrodes of the thin-film transistor for controlling input and output of a signal to the pixel electrode and source and drain electrodes of the thin-film transistor in the driving circuit unit are formed from a fourth same thin metal film.

4. An active matrix substrate according to claim 2, wherein the active element for controlling input and output of a signal to the pixel electrode is a thin-film transistor and the at least one of the driving circuit units comprises a thin-film transistor;

a gate electrode of the thin-film transistor for controlling input and output of a signal to the pixel electrode and a gate electrode of the thin-film transistor in the driving circuit unit are formed from a third same thin metal film; and source and drain electrodes of the thin-film transistor for controlling input and output of a signal to the pixel electrode and source and drain electrodes of the thin-film transistor in the driving circuit unit are formed from a fourth same thin metal film.

5. A method for fabricating an active matrix substrate including: pixel electrodes for display disposed in a matrix; active elements for controlling input and output of signals to the pixel electrodes; a driving circuit unit for sending scanning signals on scanning signal lines for controlling ON and OFF operation of the active elements in a sequential manner; and a driving circuit unit for sending data signals on data signal lines for providing data to the pixel electrodes via the active elements, the method comprising the steps of:

patterning a first thin metal film so as to form, from the same first thin metal film, a clock signal line in at least one of the driving circuit units and a scanning signal line; and patterning a second thin metal film so as to form, from the same second thin metal film, a constant voltage line in at least one of the driving circuit units and a data signal line.

6. An active matrix substrate according to claim 3, wherein the first same thin metal film is the same film as the third same thin metal film.

7. An active matrix substrate according to claim 3, wherein the second same thin metal film is the same film as the fourth same thin metal film.

8. An active matrix substrate according to claim 4, wherein the first same thin metal film is the same film as the third same thin metal film.

9. An active matrix substrate according to claim 4, wherein the second same thin metal film is the same film as the fourth same thin metal film.

* * * * *